Feb. 6, 1962 J. A. MOFFITT, JR., ETAL 3,020,185
WIRE REINFORCED POLYTETRAFLUOROETHYLENE SEAL
Filed July 28, 1958 2 Sheets-Sheet 1
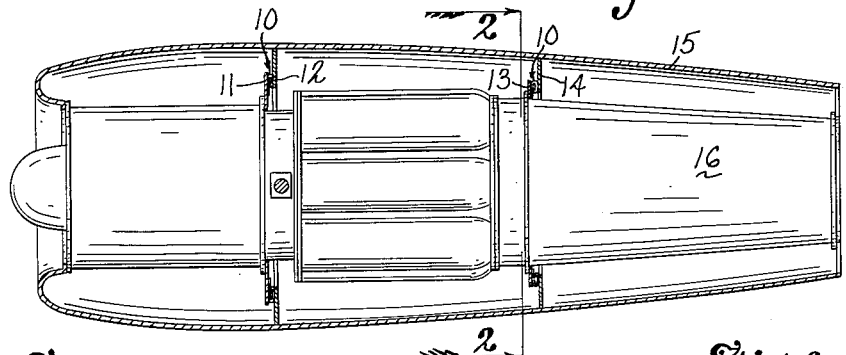
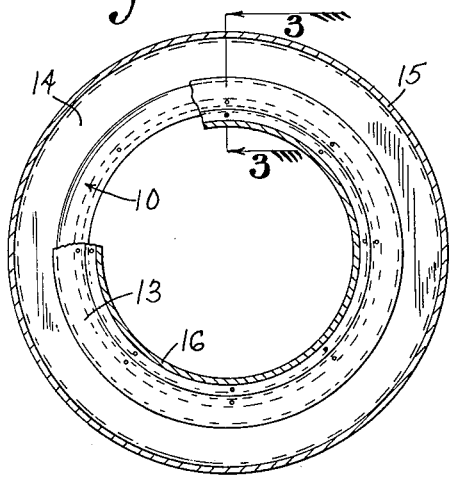
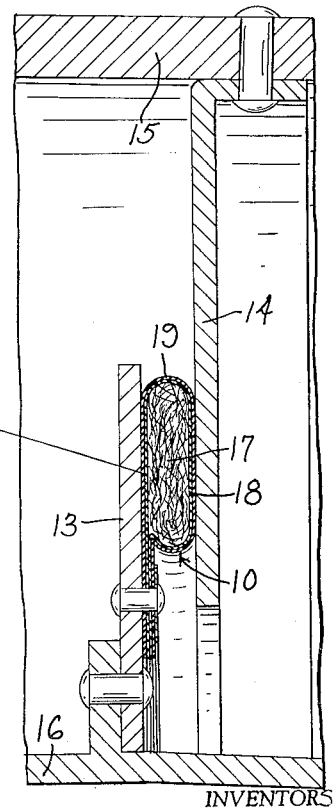
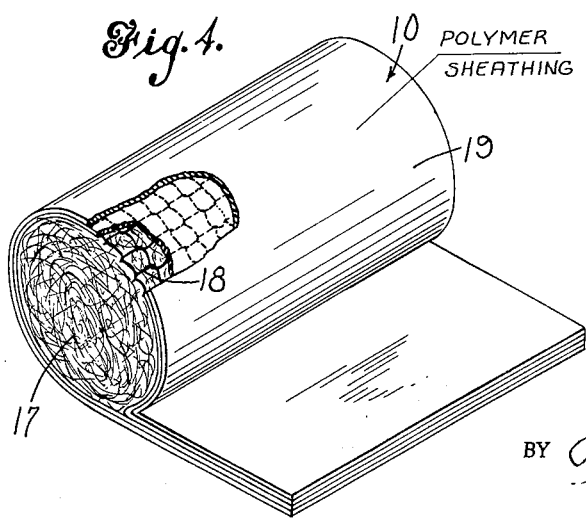
INVENTORS
John A. Moffitt, Jr. and
Alfred S. Kidwell
BY
ATTORNEYS

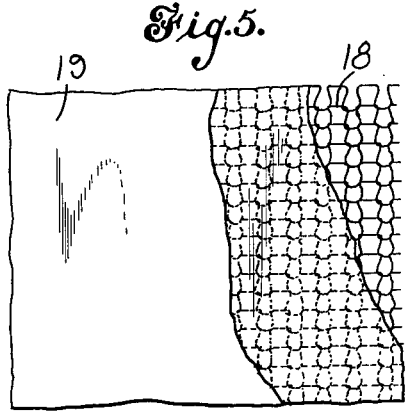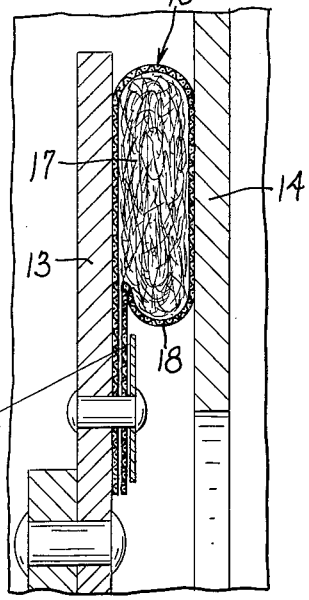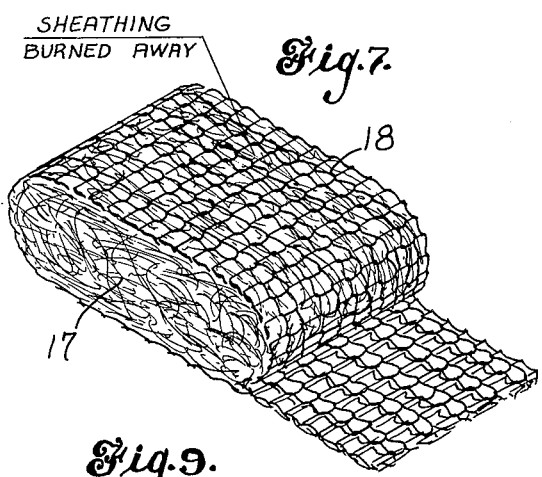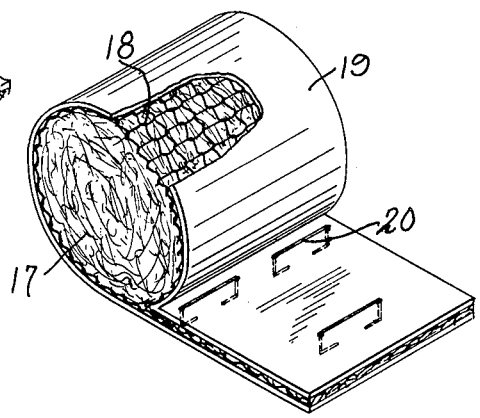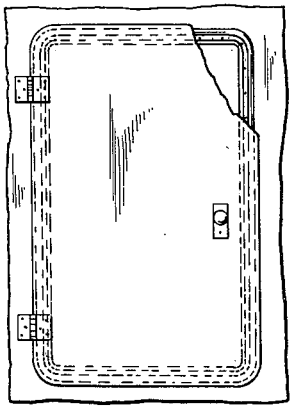

United States Patent Office 3,020,185
Patented Feb. 6, 1962

3,020,185
WIRE REINFORCED POLYTETRAFLUORO-
ETHYLENE SEAL
John A. Moffitt, Jr., North Haven, and Alfred S. Kidwell, Milford, Conn., assignors to The Connecticut Hard Rubber Company, New Haven, Conn., a corporation of Connecticut
Filed July 28, 1958, Ser. No. 751,248
5 Claims. (Cl. 154—53)

This invention relates to a novel seal adapted to provide an effective barrier against passage of gaseous and vaporous material under normal circumstances. A primary object of the invention is to provide a dual-function seal construction adapted to confine fumes or explosive vapors to an established area and to function effectively as a fire-break barrier under emergency conditions to prevent penetration of accidental fire to the opposite side of the seal.

The invention has particular application to aircraft jet engines in connection with which it will be described, although other applications are obvious. In the pod mountings for such engines, for example, it is desirable to preclude any escaping fuel vapors in the forward compression stage from reaching the combustion and flame areas at the aft end of the mounting. Customarily one or more circular tadpole-type seals are mounted between the jet propulsion unit and the surrounding pod to prevent escaping vapors from reaching the flame area of the unit.

Heretofore, fuselage seals of the above-mentioned type included a core material of compressible metal wire or glass fibers with an enclosing sheath of asbestos or glass fabric, sometimes impregnated with neoprene, polytetrafluoroethylene or other fuel-resistant polymers, to resist fuel penetration. In the event of a fire at the forward end of the engine, the polymer sheathing is quickly dispersed, leaving the compressible glass fabric or metal fiber core material which for a short time provides a fire barrier against the passage of flame in the opposite direction. However, the structural integrity of the seal is lost after the polymer disintegrates, and the compressible core may become dislodged and lose its effectiveness. A main object of the present invention is to provide a seal construction which, in addition to sealing explosive fuels from the rear compartments of the engine, provides an effective fire barrier which remains in position sufficiently long during the critical escape period, allowing the pilot to control the fire or abandon the plane.

The drawings attached show illustrative embodiments of the invention, wherein

FIG. 1 is a section of the pod and jet propulsion unit showing the sealing devices in position;

FIG. 2 is a section on line 2—2 of FIG. 1;

FIG. 3 is a transverse sectional detail on line 3—3 of FIG. 2;

FIG. 4 is an enlarged detail showing a seal formed in accordance with a preferred embodiment of the invention;

FIG. 5 is a detail of the seal sheathing partly broken away to expose separate layers thereof;

FIG. 6 is a view similar to FIG. 3, showing a vertical section of the seal in position but with the plastic burned away during a fire;

FIG. 7 shows a section of the structural portion of the seal with the plastic burned away as in FIG. 6;

FIG. 8 shows a modification of the seal; and

FIG. 9 illustrates the application of the seal to a fire door or the like.

In accordance with the invention, we have provided a unique and entirely new form of high-temperature seal construction having great utility in the aircraft industry and for other applications. This seal comprises a unique combination of materials and consists of a compressible metal-wire core contained within an enclosing wire-mesh fabric sheath. The wire-mesh fabric sheath is preferably covered with a continuous sheathing of temperature-resistant plastic material, for example, polytetrafluoroethylene. Preferably the sheathing material is primed or etched by appropriate methods to make it readily bonded by conventional cements or adhesive compositions.

In a preferred form of the invention, the plastic film sheath and wire-fabric sheath are held in position around the central core by means of an appropriate cement, especially a fuel-resistant high-temperature resistant elastomer material marketed under the trademark "Viton A" by E. I. du Pont de Nemours & Co. Viton A is a copolymer of perfluoropropylene and vinylidene fluoride. Other materials may likewise be employed, including many of the temperature-resistant epoxy resins presently on the market.

One of the primary advantages of our construction over seal constructions of the form heretofore available, is that the combination of wire-mesh sheathing and plastic such as polytetrafluoroethylene film sheathing is much lighter in weight, more flexible, and easily formed into various shapes, and more resistant to fuel penetration than the available constructions used in such installations.

Another advantage is that the novel construction is useful over a temperature range of from below −65° F. to an upper temperature of about 550° F. The lower temperature limit is a function of the material used as an adhesive to bond the sheath layers together around the core material, and, in the case of Viton A adhesive, a load required to compress a ¾ inch diameter circular core seal to 75% of its initial height at −65° F. is less than 10% greater than the load required to compress the material to the same degree at room temperature.

The highest temperature at which the seal may be used in service is a function of the polymeric film sheath. In the case of the polytetrafluoroethylene film sheath, the upper temperature for continuous service is about 550° F.

In certain applications a main function of the seal will be to serve as a fire stop, where it will prevent temporarily the penetration of a flash fire through the seal. Experimental results obtained by holding the seal construction in a metal jig and exposure of the seal to flame temperatures of approximately 2,000° F. showed no penetration of the flame through the seal after an exposure period of approximately 15 minutes.

In a preferred method of forming the seal construction of the present invention, polytetrafluoroethylene sheet material may be primed on one surface by the sodium etch process described in U.S. Patent 2,789,063. An adhesive composition is prepared composed of 100 parts of Viton A gum, 40 parts of carbon black, 9 parts of magnesium oxide and 1 part of hexamethylene diamine carbamate. The composition is milled and then dispersed in methyl isobutyl ketone in the proportion of 30 parts solids to 100 parts of the solvent. The resulting viscous adhesive is painted on the etched surface of the polytetrafluoroethylene sheet material, and a wire mesh or fabric of Inconel is placed over the painted surface of the polytetrafluoroethylene. A further coating of the Viton A solution is then spread over the Inconel mesh fabric and dried.

Alternatively, a thin thermoplastic sheet of Viton A of approximate thickness of 0.01 inch is positioned over the Inconel mesh on the primed surface of the polytetrafluoroethylene and the assembly subjected to heat and pressure to soften the Viton A sheet and secure the mesh to the primed surface of the polytetrafluoroethylene.

The dried and cured reinforced sheathing is then wrapped around a compressible core, which may also be an Inconel batting or simply rolled Inconel mesh fabric, and the free ends of the sheathing secured together in any appropriate manner. Inconel alloy is a highly temperature-resistant metal composed of about 78% nickel, 15% chromium and 6% iron.

Referring more particularly to the drawings wherein for illustrative purposes specific embodiments are shown, an improved fire-break seal 10 is mounted between brackets 11, 12 and 13, 14 of the outer pod 15 and the jet propulsion unit 16 disposed within the pod. As shown in FIG. 4, the seal itself comprises the compressible wire core 17, and the wire-mesh fabric sheath 18 adhesively attached to the interior of the primed temperature-resistant sheathing material 19, preferably polytetrafluoroethylene. The tail ends of the tadpole seal are adhered together during the curing process previously described, or by any other appropriate means such as the staples in FIG. 8.

FIGS. 6 and 7 illustrate the structural fire barrier which exists after exposure of the seal to flame temperatures of 2000° F. or more, wherein the plastic outer cover and cementing layers are burned away. A modification is shown in FIG. 8, wherein the compressible wire core 17 is contained within the uncemented wire-fabric sheath 18 and outer polytetrafluoroethylene sheathing 19. In this case, the tail ends of the tadpole seal may be suitably secured by any appropriate means such as the staples 20. FIG. 9 illustrates the application of the invention to a fire door or the like.

If the seal is exposed to a flame or fire of sufficient temperature to destroy the polymeric film sheath and cement material, then the knitted wire-mesh sheath remains intact throughout the flame exposure to hold the metal-wire core in place where it will serve as a firestop, preventing passage of the flame beyond the seal.

If the core material and the knitted wire-mesh sheath material are made of Inconel alloy, it will be recognized that a flame of considerable intensity and duration can be withstood before eventual oxidation or melting of the metal alloy core and sheath material will cause failure of the seal.

Until such time that a flame might destroy the polymeric film sheath material, the original seal construction would serve as a resilient seal, highly resistant to penetration or absorption of fuels or other fluid materials, depending upon the composition of the polymeric sheath material, and serviceable over a very broad temperature range, according to the polymeric sheath material.

What we claim is:

1. A fire-impervious seal comprising an inner compressible metal-wire core, an enclosing wire-mesh fabric sheath, and an outer sheath of primed adhesive receptive polytetrafluoroethylene film, the wire-mesh fabric sheath being adhesively attached to the primed surface of the polytetrafluoroethylene.

2. A fire-impervious seal comprising an inner metal-fiber batting, an enclosing wire-mesh fabric surrounding the batting, and an outer sheath of impermeable heat resistant plastic material.

3. A fire-impervious seal comprising an inner indestructible metal-fiber batting, a surrounding wire-mesh fabric, and an outer sheathing of polytetrafluoroethylene.

4. A fire-impervious seal comprising an inner compressible metal-wire batting, and a wire-mesh fabric surrounding the batting and adhered to the inner primed adhesive receptive surface of a surrounding sheathing of polytetrafluoroethylene.

5. A fire-impervious seal comprising an inner compressible metal-wire batting, an enclosing sheath of polytetrafluoroethylene, and a metal-wire fabric adhered to an inner primed adhesive receptive surface of the polytetrafluoroethylene by thermoplastic cement.

References Cited in the file of this patent

UNITED STATES PATENTS

| | | |
|---|---|---|
| 1,203,762 | Mastin | Nov. 7, 1916 |
| 1,648,391 | Farrington | Nov. 8, 1927 |
| 1,958,131 | Davidson | May 8, 1934 |
| 2,072,543 | Crane | Mar. 2, 1937 |

FOREIGN PATENTS

| | | |
|---|---|---|
| 212,880 | Australia | Jan. 29, 1958 |
| 496,418 | Canada | Sept. 29, 1953 |
| 771,561 | Great Britain | Apr. 3, 1957 |

OTHER REFERENCES

Product Engineering, September 1952, pages 149–153, copy in Library, 288–S.R.